(12) United States Patent
Cavallucci et al.

(10) Patent No.: US 7,518,738 B2
(45) Date of Patent: Apr. 14, 2009

(54) METHOD AND A DEVICE FOR OPTICALLY DETECTING THE POSITION OF AN OBJECT BY MEASURING LIGHT REFLECTED BY THAT OBJECT

(75) Inventors: Gilles Cavallucci, Nimes (FR); Julien P. Sylvestre, Nimes (FR); Philippe G. Plantier, Nimes (FR)

(73) Assignee: H2I Technologies, Nimes (FR)

( * ) Notice: Subject to any disclaimer, the term of this patent is extended or adjusted under 35 U.S.C. 154(b) by 302 days.

(21) Appl. No.: 10/540,579

(22) PCT Filed: Sep. 2, 2004

(86) PCT No.: PCT/FR2004/002245

§ 371 (c)(1),
(2), (4) Date: Jun. 24, 2005

(87) PCT Pub. No.: WO2005/024621

PCT Pub. Date: Mar. 17, 2005

(65) Prior Publication Data

US 2006/0152740 A1 Jul. 13, 2006

(30) Foreign Application Priority Data

Sep. 2, 2003 (FR) .................................. 03 10378

(51) Int. Cl.
*G01B 11/14* (2006.01)
(52) U.S. Cl. .................................................... 356/614
(58) Field of Classification Search ................ 356/614; 345/175
See application file for complete search history.

(56) References Cited

U.S. PATENT DOCUMENTS

| | | | | |
|---|---|---|---|---|
| 4,986,662 | A | | 1/1991 | Bures |
| 5,003,505 | A | * | 3/1991 | McClelland ................. 345/173 |
| 5,220,409 | A | * | 6/1993 | Bures .......................... 356/621 |
| 5,764,223 | A | * | 6/1998 | Chang et al. ................. 345/175 |
| 6,690,363 | B2 | * | 2/2004 | Newton ........................ 345/173 |
| 7,221,462 | B2 | * | 5/2007 | Cavallucci ................... 356/614 |
| 2002/0033805 | A1 | * | 3/2002 | Fujioka et al. ............... 345/175 |
| 2003/0006973 | A1 | | 1/2003 | Omura et al. |
| 2004/0246105 | A1 | * | 12/2004 | Cavallucci ............. 340/286.01 |

FOREIGN PATENT DOCUMENTS

| | | |
|---|---|---|
| EP | 0316972 | 5/1985 |
| EP | 1039365 A2 | 9/2000 |
| EP | 1168233 A2 | 6/2001 |
| FR | 2443173 | 11/1979 |

* cited by examiner

*Primary Examiner*—Tarifur R. Chowdhury
*Assistant Examiner*—Isiaka O Akanbi
(74) *Attorney, Agent, or Firm*—Clark & Brody

(57) ABSTRACT

This detection method comprises: a step during which a receiver measures the quantity of light reflected by an object when the object is illuminated by an emitter for at least two different emitter—receiver pairs on the same side relative to the object, a step of calculating at least two characteristic values from the measured values, and a step of determining at least one position of the object by directly reading a table indexed by the two characteristic values, the content of said table being predetermined and set before said measurement step.

39 Claims, 5 Drawing Sheets

METHOD AND A DEVICE FOR OPTICALLY DETECTING THE POSITION OF AN OBJECT BY MEASURING LIGHT REFLECTED BY THAT OBJECT

The invention relates to a method and to a device for determining the position of an object on a particular area of a surface, in particular, although not exclusively, for the purposes of inputting data.

One technical field of the invention is that of fabricating keypads and similar devices for manual data input to computers, fixed or mobile telephones, personal digital assistants, or any other electronic device.

BACKGROUND OF THE INVENTION

Many optical systems are used to detect the position of a member or an object for the purposes of inputting data, in particular alphanumeric data.

The patent FR 2 443 173 describes a keypad with movable keys including a plurality of light emitters and a plurality of light receivers for detecting depression of the keys; that keypad is costly because it requires a large number of mechanical and optoelectronic components and it is complex because light emitters and receivers are distributed throughout the area in which the keys are situated.

More recently, static data input devices have been developed.

U.S. Pat. No. 4,986,662 describes a system similar to the above system in which the sources are placed at the focuses of respective parabolic reflectors in order to reduce the number of optoelectronic components.

One drawback of the above devices is that it is necessary to distribute the optical components over substantially the whole of the perimeter of the input area with sufficient geometrical accuracy not to falsify calculations based on data representative of signals delivered by the light receivers to determine the position in the input area of the object (finger, etc.) used to indicate data selected by the user. As a result of this, such devices remain relatively costly.

Furthermore, a device designed for a surface of given size is not easily adaptable to a surface of different size.

Document EP 1 039 365 describes a virtual keypad including infrared light transducers adapted to determine the distance of an object (finger, stylus) by measuring the attenuation of light reflected by that object.

To be more precise, that method is based on taking the signal received by the transducer delivering the greatest amount of energy and processing it in accordance with an inverse square law based on the distance between the object and the receiver (and the lower energy signals received by the other transducers are not processed).

Those values are divided into ranges each corresponding to one row of the virtual keypad and then sampled.

That method has a first drawback in that it is not able to detect the position of an object accurately if it is not perfectly aligned with the infrared receiver.

It has a second drawback in that it is not able to obtain the precise position of an object of irregular shape (for example a finger) even if the said object is aligned with a detector, in particular because the signal received after reflection from an irregular shape is far from linear.

Naturally, one solution to that problem is to increase the number of transducers, to the detriment of the cost and the complexity of the device.

Document EP 1 168 233 describes an optical detection device using a neural network to analyze the reflected signal.

One drawback of that method is that it requires a large number of samples to train the neural network.

If the neural network is trained with a relatively small number of samples (relative to the number of neurons), the result of the interpolation effected by the neural network is reliable only for detecting objects under the same conditions as apply to the above-mentioned samples, and it becomes difficult to predict and very uncertain as soon as the measurement conditions depart from the training conditions.

Over and above this, the execution of a neural network in an embedded system consumes a detrimental quantity of computation resources.

OBJECTS AND SUMMARY OF THE INVENTION

The invention solves the above-mentioned problems. To this end, in a first aspect, the invention provides an optical detection method of determining the position of an object in a particular detection area of a surface, the method comprising:

a preliminary step of disposing in the vicinity of said detection area and on the same side thereof relative to the object at least three elements including at least one emitter of light and at least one receiver of light adapted to cover the detection area, each emitter being adapted to emit light in such a way that it does not hit said surface in the detection area, and the method further comprising:

a step during which one of said receiver measures the quantity of light reflected by the object when the object is illuminated by one of said emitter for at least two different emitter-receiver pairs;

a step of calculating at least two characteristic values from said measured values; and a step of determining at least one position of the object by directly reading a table indexed by said at least two characteristic values, the content of said table being predetermined and set before said measurement step.

Accordingly, the position of the object is detected using at least two measurements effected by two different emitter-receiver pairs.

This method provides much more reliable detection than when analyzing only the signal received by the transducer delivering the maximum energy, in particular when the object to be detected is not aligned with a transducer.

Thus this method avoids multiplying the number of emitters and receivers.

The Applicant has found that this two-fold measurement avoids the problem of the non-linear character of the reflected signal and considerably improves the detection of an object of irregular shape.

Moreover, using characteristic values to index the table of positions considerably reduces the size of the memory necessary for storing this table and the number of measurements necessary for constructing it.

In this regard, the Applicant has found that two or three characteristic values are sufficient in practice to detect the position of a depressed key when one emitter (or receiver) is associated with one or two receivers (or emitters).

Moreover, the position of the object in the detection area is obtained directly by reading the table of positions using the characteristic values.

The detection method of the invention is therefore much simpler than a method based on using a neural network.

In a first embodiment of the invention, each emitter is associated with only one receiver and at least two characteristic values are used, each of which is equal to the values measured by a receiver when only the emitter associated with that receiver is turned on.

This embodiment is particularly simple to implement. Two emitter-receiver pairs situated side-by-side are preferably used.

In a second embodiment of the invention, during said preliminary step, emitters and receivers are disposed in an alternating and regular arrangement and a characteristic value is calculated for each emitter by averaging the values measured by the receivers on each side of said emitter when only said emitter is turned on. In this situation, an emitter is said to be associated with two light receivers.

In a third embodiment, substantially similar to the above second embodiment, a characteristic value is calculated for each receiver by averaging values measured by that receiver when the emitters situated on either side of the receiver are turned on successively. In this situation, a receiver is said to be associated with a plurality of light emitters.

The second and third embodiments are preferred to the first embodiment, firstly because the characteristic values are much less sensitive to background noise and secondly because they offer improved detection of the position of an object of irregular shape.

In a fourth embodiment, the emitters and the receivers are disposed in any manner and a characteristic value is calculated for each emitter by calculating a function of the values measured by at least three receivers when only that emitter is turned on, the coefficients of this affine function being a function of the distance between each receiver and that emitter.

The measurement step is preferably repeated for each of the emitter-receiver pairs until a stable quantity of reflected light is measured.

This supplementary precaution advantageously circumvents any background noise present during an isolated measurement.

The person skilled in the art will understand that, in order to detect movement of an object in addition to its position, this stabilization step is implemented only during a time period compatible with the speed at which the object is moving.

In a preferred embodiment, the predetermined table of positions is obtained by a polynomial regression method from a number of preliminary measurements effected under the same conditions as apply to said measurement step.

This method advantageously further limits the number of measurements necessary to produce the table.

The person skilled in the art will understand that, in the present context, the concept of identical measurement conditions refers to the same type of object, the same types of emitters and receivers, the same arrangement of these components, etc.

When the surface on which detection is effected is substantially plane, it is preferable to dispose the light emitters and receivers in a single line with their respective emission and reception axes substantially parallel to said particular detection area.

Because the set of emitters and receivers is disposed in a single line on the same side of the object, detecting the position of the object can be adapted to an area of any size.

The light emitted by the light emitters is advantageously ordinary non-coherent light.

The wavelength of the emitted light may be in one of the following ranges of wavelengths: UV, visible, infrared, the emitters and receivers used being less complex and less costly than emitters/receivers of coherent (laser) light or electromagnetic emitters/receivers.

In a preferred embodiment of the invention, the particular area includes a set of elementary areas each associated with a given function so that any position of the object in an elementary area activates the function associated with that elementary area.

Thus the invention can be used to detect the position of an object (finger, stylus) operating a virtual keypad in which each key of the keypad corresponds to an elementary area in the sense of the invention.

In one particular embodiment of the invention, the particular area is rectangular and the light emitters and receivers are disposed in the vicinity of only one side of said rectangular area.

This configuration optimizes the number of elementary areas.

The invention is also directed to an optical detection device for determining the position of an object on a particular detection area of a surface, said device comprising, disposed in the vicinity of said particular area, and on the same side thereof with respect to the object, at least three elements including:

at least one emitter of light adapted to emit light so that it does not hit said surface in the detection area; and at least one receiver of light adapted to cover said detection area and to measure a value representative of the quantity of light reflected by the object, said device including control means for turning on the emitter and said device further comprising processor means adapted:

to obtain and store for at least two different emitter-receiver pairs the quantity of light reflected by the object and measured by the receiver when the object is illuminated by the emitter;

to calculate at least two characteristic values from the measured values; and to determine at least one position of the object by directly reading a table indexed by said characteristic values, the content of said table being predetermined and set before said step of obtaining the quantities of light.

The particular area may comprise a set of elementary areas each associated with a given function, so that any position of the object in an elementary area activates the function associated with that elementary area.

The particular area may correspond to an input area and each of the elementary areas may correspond to a key.

The invention is also directed to a data input terminal including an optical detection device having the above features.

BRIEF DESCRIPTION OF THE DRAWINGS

The invention will be better understood on reading the following description, which is given by way of illustrative and non-limiting example and with reference to the appended drawings, in which.

MORE DETAILED DESCRIPTION

Figure 1:
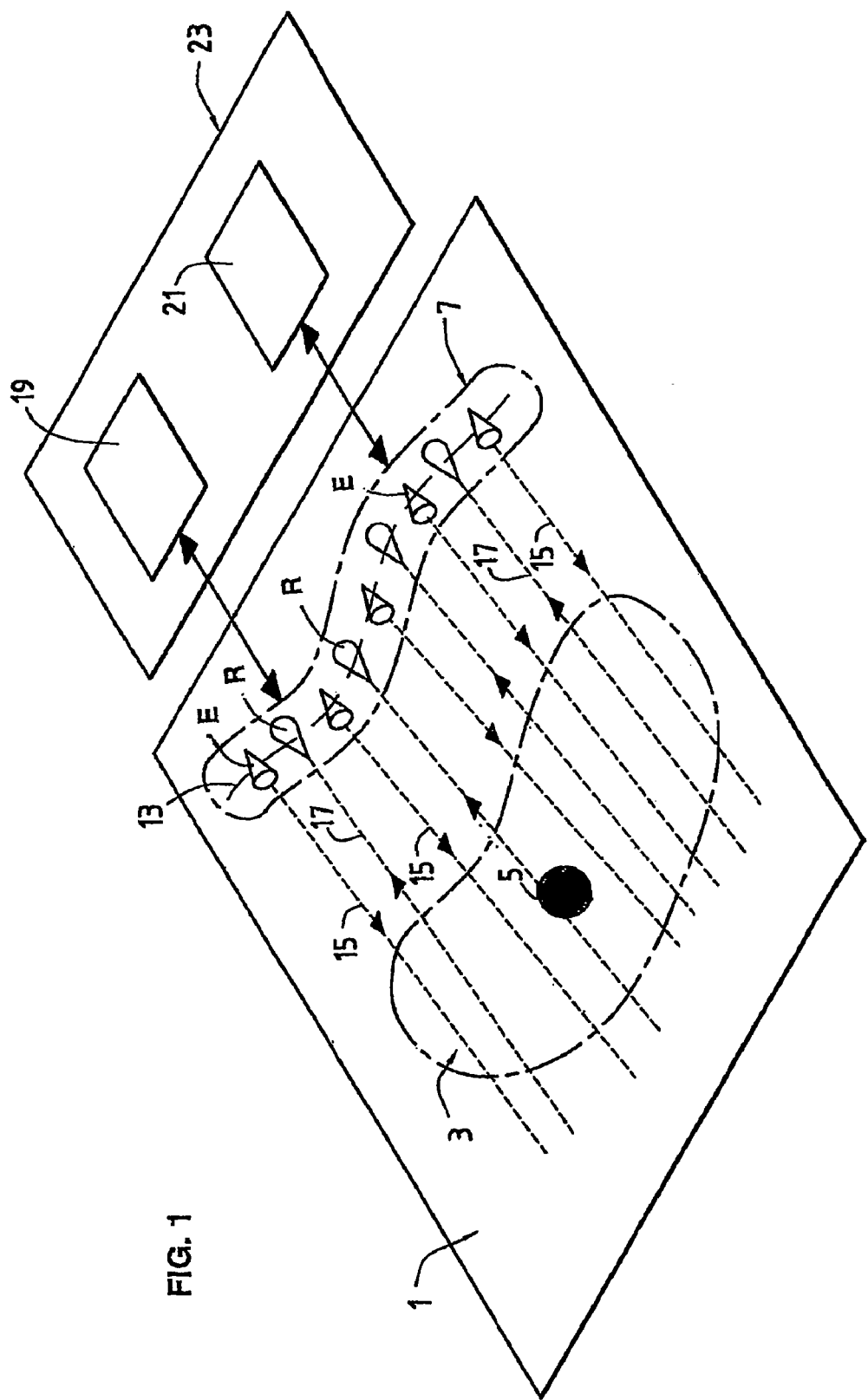
FIG. 1 is a diagram of a device of the invention for optically detecting an object in a particular area of a surface.

FIG. 1 shows a surface 1 including a particular area 3 on which an object 5 is to be detected in accordance with the invention.

The invention applies in particular to determining the position of an object 5 such as a finger of a user or a writing instrument or a pointer such as a stylus that is placed near or in contact with the particular area 3.

Thus this particular area 3, which corresponds to a detection area, may be of any shape and size.

Moreover, an alternating set 7 of emitters E and receivers R of light is disposed in the vicinity of the particular area 3, all on the same side of the object 5, the emitters E emitting light that covers the whole of the area 3.

In the present embodiment, the surface 1 is substantially plane.

However, this is optional, provided that the light emitted by the emitters E is not intercepted by the surface 1 in the detection area 3.

In the FIG. 1 example, the emitters E and receivers R are disposed in a single line 13.

It is not necessary for the light emitted to be coherent, like laser light, and it can advantageously be ordinary infrared, visible, or ultraviolet light.

The optoelectronic receivers R are sensitive to the light emitted by the emitters E and they also cover the particular area 3.

In the present embodiment, each emitter E and receiver R of light has its respective emission or reception axis 15 or 17 substantially parallel to the particular area 3, with the result that the set 7 of emitters E and receivers R operates optimally in a plane parallel to this area 3.

In the preferred embodiment described here, the light emitters E are turned on independently of one another, and not necessarily successively. Accordingly, the light signal received by at least one receiver R for each emitter E that is turned on can be measured.

In the remainder of the description, the notation V(Ei, Rj) denotes the quantity of light reflected by the object 5 and measured by the receiver Rj when only the emitter Ei is turned on.

To this end, FIG. 1 shows control means 19 for turning on the emitters E and processor means 21 for measuring the signals received by the receivers R.

The control means 19 and the processor means 21 may be integrated into the same control unit 23.

Figure 2A:
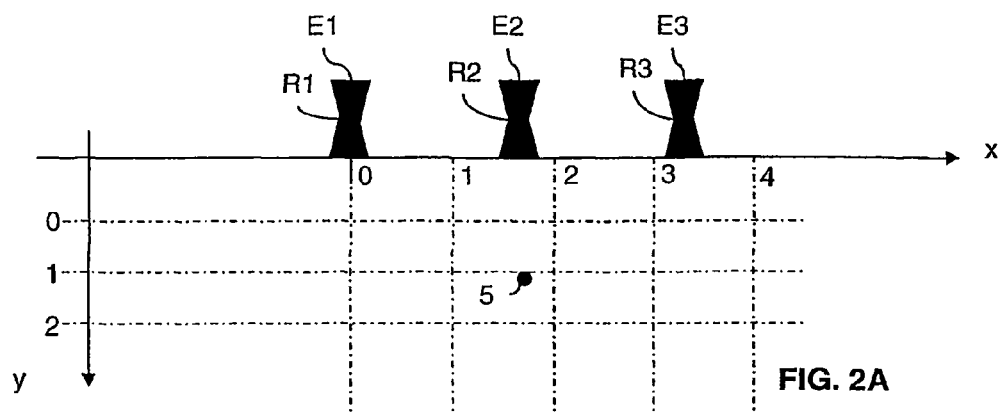
FIGS. 2A to 2C show arrangements of emitters and receivers that may be used in the FIG. 1 detection device.
Figure 2B:
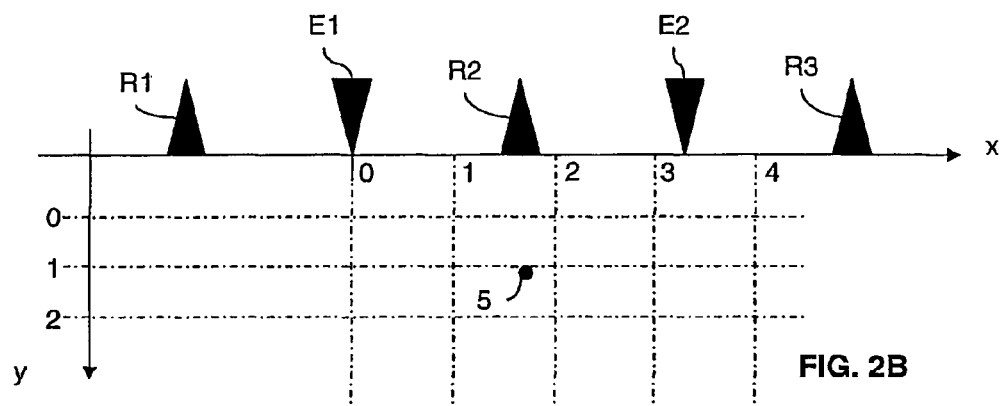
Figure 2C:
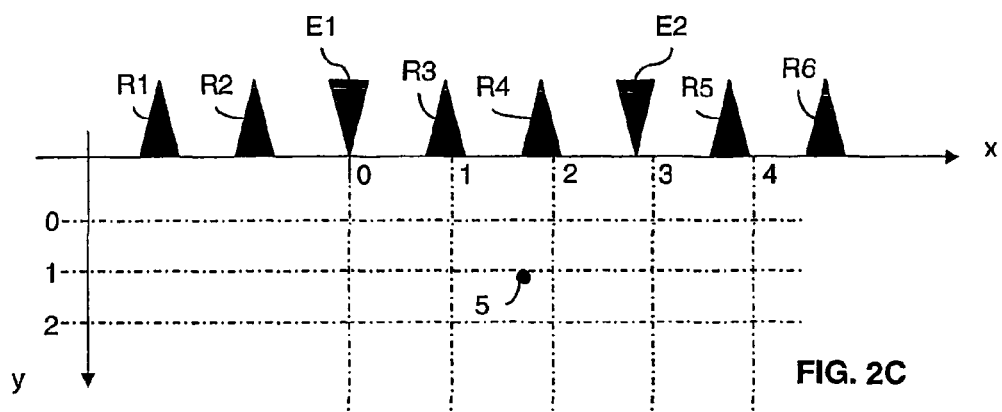

FIGS. 2A to 2C represent different arrangements of the emitters E and the receivers R in accordance with the invention.

Each of these figures shows a Cartesian system of two perpendicular axes x, y for identifying the position of an object 5.

The present example uses a system of relative coordinates (x, y) expressed in centimeters (cm) in which:

the abscissa origin (x) is in front of the emitter E1, and the ordinate origin (y) is 0.5 cm from the line formed by the emitters E and the receivers R.

In these three examples, the position of the object 5, corresponding to the position of the point on it closest to the emitters and receivers, is (1.75, 1).

In the first embodiment, shown in FIG. 2a, a plurality of receivers Ri is used, each associated with a single emitter Ei.

In this embodiment, an emitter and its associated receiver are preferably positioned one below the other.

In accordance with the invention, the position of the object 5 may be determined by the processor means 21 calculating at least two characteristic values K1, K2 from measurements of the quantity of light reflected by the object 5 effected for two separate emitter-receiver pairs.

In the FIG. 2A embodiment, the characteristic value K1 (or K2) may be made equal to the value measured by the receiver R1 (or R2) when only the associated emitter E1 (or E2) is turned on.

In other words, with the notation specified:

$K1=V(E1, R1)$, $K2=V(E2, R2)$, $K3=V(E3, R3)$, etc.

The characteristic values K are expressed in volts (V).

To increase the accuracy of the measured position of the object, in particular if the object is either highly reflective or not very reflective or is at the boundary of the particular area 3, it is advantageous to increase the number of receivers associated with each emitter. For example, two receivers may be associated with each emitter.

In the FIG. 2b arrangement, the emitters E and the receivers R are disposed in an alternating and regular arrangement.

In this arrangement, a characteristic value K may be chosen for each emitter E by averaging the values measured by its two neighboring receivers when only this emitter E is turned on.

In other words:

$K1=0.5*(V(E1, R1)+V(E1, R2)$, $K2=0.5*(V(E2, R2)+V(E2, R3)$, etc.

However, a characteristic value K may also be chosen for each receiver R by averaging the values measured by that receiver when these two neighboring emitters are turned on successively.

In other words:

$K1=0.5*(V(E1, R2)+V(E2, R2)$, $K2=0.5*(V(E2, R3)+V(E3, R3)$, etc.

Generally speaking, when a plurality of emitters and receivers is available, a characteristic value associated with an emitter may be chosen by calculating a function of the values measured by at least two receivers when only that emitter is turned on, the coefficients of that function being a function of the distance between the emitter and a receiver.

Accordingly, as shown in FIG. 2C, the characteristic value K1 associated with the emitter E1 may be made equal to:

$K1=\frac{1}{6}(V(E1, R1)+2V(E1, R2)+2V(E1, R3)+V(E1, R4))$

In this preferred embodiment, for reasons of simplification, only two characteristic values K1, K2 are calculated. The person skilled in the art will of course understand that increasing the number of characteristic values increases the accuracy of detection, but to the detriment of calculation time and memory occupancy.

In accordance with the invention, the position x (or y) of the object in the detection area 3 is read directly in a table Tx (or Ty) of positions indexed by the characteristic values K1, K2.

In the preferred embodiment described here, the content of this table is obtained by first effecting a series of preliminary measurements of the above characteristic values for a certain number of positions of an object of the type to be detected.

These pre-calculated tables include a large number of samples of these two values acquired beforehand for a given object whose light reflecting characteristics are close to those of the type of object to be detected (a human finger in this example).

For example, tables T1 and T2 below respectively give the characteristic values K1 and K2 for a finger placed at different positions x, y in the detection area of the FIG. 2B arrangement.

TABLE T1

K1 as a function of x and y

| y | x=0 | x=0.5 | x=1 | x=1.5 | x=2 |
|---|---|---|---|---|---|
| 0 | 2.6460 | 1.9260 | 1.1120 | 0.7290 | 0.4970 |
| 0.5 | 2.3786 | 1.8600 | 0.9726 | 0.6740 | 0.5548 |
| 1 | 1.8158 | 1.5300 | 0.7958 | 0.5670 | 0.4744 |
| 1.5 | 1.1802 | 0.9800 | 0.6962 | 0.5330 | 0.3996 |
| 2 | 1.1030 | 0.8600 | 0.7270 | 0.5100 | 0.4980 |

TABLE T2

K2 as a function of x and y

| y | x=0 | x=0.5 | x=1 | x=1.5 | x=2 |
|---|---|---|---|---|---|
| 0 | 0.7478 | 0.9870 | 1.1526 | 1.9140 | 2.3786 |
| 0.5 | 0.5376 | 0.7540 | 1.1632 | 1.7030 | 2.0622 |
| 1 | 0.5220 | 0.6430 | 1.1590 | 1.6020 | 1.9250 |
| 1.5 | 0.4234 | 0.5320 | 0.8598 | 1.1000 | 1.1928 |
| 2 | 0.3892 | 0.5310 | 0.7644 | 0.8570 | 0.9254 |

The relations between the signals received by the various emitter-receiver pairs and the position of the object 5 can quickly become complex, and so a model is used that is based on measurement of the results obtained for a known position of an object, which is then modeled using a polynomial regression method and on the basis that the relationship between the measured values and the coordinates of the object takes the form of a polynomial of predefined degree, and an optimization method is applied in a manner that is known in the art to determine the coefficients of that polynomial.

In the present example, a polynomial regression of the third degree in x and the third degree in y is effected to interpolate the tables T1 and T2.

In a manner that is known in the art, this amounts to determining the coefficients $P_{K1,n,m}$ and $P_{K2,n,m}$ of the polynomials $P_{K1}$ and $P_{K2}$ for interpolation of the characteristic values K1 and K2.

There are obtained for the polynomials $P_{K1}$ and $P_{K2}$, using the following notation:

$$P_{K1}(x,y) = \sum_{n=0,m=0}^{n=3,m=3} p_{K1,n,m} x^n y^m, \quad P_{K2}(x,y) = \sum_{n=0,m=0}^{n=3,m=3} p_{K2,n,m} x^n y^m$$

Factors $p_{K1,n,m}$ of $P_{K1}$

| n \ m | 3 | 2 | 1 | 0 |
|---|---|---|---|---|
| 3 | 0.3198 | −1.1787 | 1.0280 | 0.1519 |
| 2 | −0.7237 | 2.8405 | −2.7832 | −0.0560 |
| 1 | −0.0127 | −0.4555 | 1.5417 | −1.5673 |
| 0 | 0.5774 | −1.6591 | 0.2281 | 2.6513 |

Factors $p_{K2,n,m}$ of $P_{K2}$

| n \ m | 3 | 2 | 1 | 0 |
|---|---|---|---|---|
| 3 | 0.0417 | 0.0829 | −0.2968 | −0.1443 |
| 2 | −0.1752 | −0.0527 | 0.5083 | 0.7257 |
| 1 | 0.3223 | −0.7517 | 0.3932 | −0.0687 |
| 0 | −0.0956 | 0.3768 | −0.5644 | 0.7643 |

A discrete method is then used to obtain an approximation of the functions Tx(K1, K2) and Ty(K1, K2) that are the inverses of the interpolated functions $P_{K1}(x,Y)$ and $P_{K2}(x,y)$.

Two tables Tx and Ty of positions are obtained in this way respectively supplying the values of the positions x and y as a function of the characteristic values K1 and K2 in the FIG. 2B arrangement example.

These pre-calculated tables include a large number of samples of these two values as acquired beforehand for a given object whose light reflection characteristics are similar to those of the type of object to be detected (a human finger in this example).

From these two parameters it is possible to obtain a sufficient approximation of the spatial position of the object, for example by effecting a polynomial regression of the fourth degree on these acquired values using a matrix calculation method known in the art. This polynomial regression is used to generate a table giving the position of the object as a function of the two input parameters.

This calculation may be carried out beforehand on a microcomputer. The processor unit in the control unit then merely calculates the "characterization values" continuously and uses the table generated by the microcomputer to determine the coordinates of the object.

In the present example, the resolution is chosen arbitrarily as 0.25 V.

Tx(K1, K2)

| K2 \ K1 | 0 | 0.25 | 0.5 | 0.75 | 1 | 1.25 | 1.5 | 1.75 | 2 |
|---|---|---|---|---|---|---|---|---|---|
| 0 | 1.0 | 0.6 | 0.3 | 0.1 | 0.0 | 0.0 | 0.1 | 0.0 | 0.0 |
| 0.25 | 2.0 | 1.0 | 0.6 | 0.3 | 0.0 | 0.0 | 0.1 | 0.1 | 0.0 |
| 0.5 | 2.0 | 1.4 | 1.0 | 0.6 | 0.4 | 0.3 | 0.3 | 0.1 | 0.1 |
| 0.75 | 2.0 | 2.0 | 1.4 | 0.9 | 0.7 | 0.7 | 0.6 | 0.5 | 0.4 |
| 1 | 2.0 | 2.0 | 1.6 | 1.1 | 0.9 | 0.8 | 0.7 | 0.6 | 0.4 |
| 1.25 | 2.0 | 2.0 | 1.5 | 1.2 | 1.1 | 1.0 | 0.8 | 0.7 | 0.5 |
| 1.5 | 1.9 | 1.9 | 1.5 | 1.3 | 1.2 | 1.1 | 0.9 | 0.8 | 0.6 |
| 1.75 | 1.8 | 1.8 | 2.0 | 1.4 | 1.3 | 1.2 | 1.0 | 0.9 | 0.7 |
| 2 | 1.8 | 1.8 | 1.7 | 1.6 | 1.5 | 1.4 | 1.2 | 1.0 | 0.8 |

| | Ty(K1, K2) | | | | | | | | |
|---|---|---|---|---|---|---|---|---|---|
| | K1 | | | | | | | | |
| K2 | 0 | 0.25 | 0.5 | 0.75 | 1 | 1.25 | 1.5 | 1.75 | 2 |
| 0 | 2.0 | 1.9 | 1.9 | 1.9 | 1.9 | 2.0 | 1.2 | 1.1 | 0.9 |
| 0.25 | 2.0 | 2.0 | 1.9 | 1.9 | 1.9 | 2.0 | 1.2 | 1.1 | 0.9 |
| 0.5 | 2.0 | 2.0 | 2.0 | 2.0 | 1.9 | 1.6 | 1.1 | 1.0 | 0.8 |
| 0.75 | 1.9 | 2.0 | 2.0 | 2.0 | 1.7 | 1.3 | 0.8 | 0.6 | 0.4 |
| 1 | 1.7 | 1.8 | 1.8 | 1.8 | 1.3 | 1.1 | 0.5 | 0.0 | 0.0 |
| 1.25 | 1.6 | 1.6 | 1.4 | 1.4 | 1.0 | 0.6 | 0.0 | 0.0 | 0.0 |
| 1.5 | 1.3 | 1.3 | 1.0 | 1.0 | 0.6 | 0.0 | 0.0 | 0.0 | 0.0 |
| 1.75 | 1.0 | 1.0 | 1.0 | 1.0 | 0.1 | 0.0 | 0.0 | 0.0 | 0.0 |
| 2 | 0.7 | 0.6 | 0.4 | 0.4 | 0.0 | 0.0 | 0.0 | 0.0 | 0.0 |

Returning to FIG. 2B, to determine the position of the object 5 represented, the following are measured:

the quantity of light V(E1, R1) measured by the receiver R1 when the object 5 is illuminated only by the emitter E1, the quantity of light V(E1, R2) measured by the receiver R2 when the object 5 is illuminated only by the emitter E1, the quantity of light V(E2, R2) measured by the receiver R2 when the object 5 is illuminated only by the emitter E2, and the quantity of light V(E2, R3) measured by the receiver R3 when the object 5 is illuminated only by the emitter E2.

The following values are obtained in this example:

$V(E1, R1) = 0.22$, $V(E1, R2) = 0.59$, $V(E2, R2) = 1.98$, and $V(E2, R3) = 1.25$.

Applying the above-specified equations:

$K1 = 0.5 * (V(E1, R1) + V(E1, R2))$, $K2 = 0.5 * (V(E2, R2) + V(E2, R3))$, the two characteristic values K1, K2 are calculated:

$K1 = 0.405$, $K2 = 1.615$.

These values are then made discrete at the resolution of the position tables Tx and Ty:

$K1 = 0.5$, and $K2 = 1.5$.

The positions x, y of the object 5 are then determined directly by directly reading the position tables Tx and Ty indexed by the characteristic values K1, K2:

$x = Tx(0.5, 1.5) = 1.5$ cm, and $y = Ty(0.5, 1.5) = 1.0$ cm.

In this example, the exact position of the object 5 is (1.75, 1). The result of the measurement is therefore acceptable, given the resolution selected.

Figure 3:
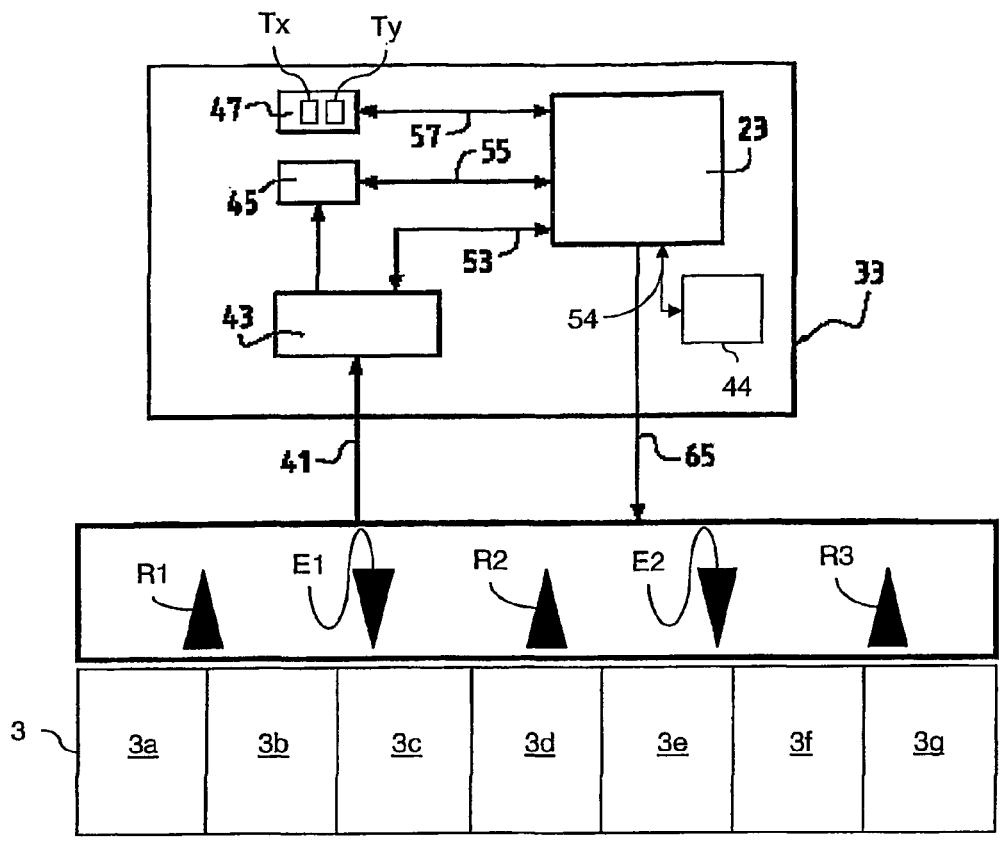
FIG. 3 shows one particular embodiment of the device of the invention.
Figure 5:
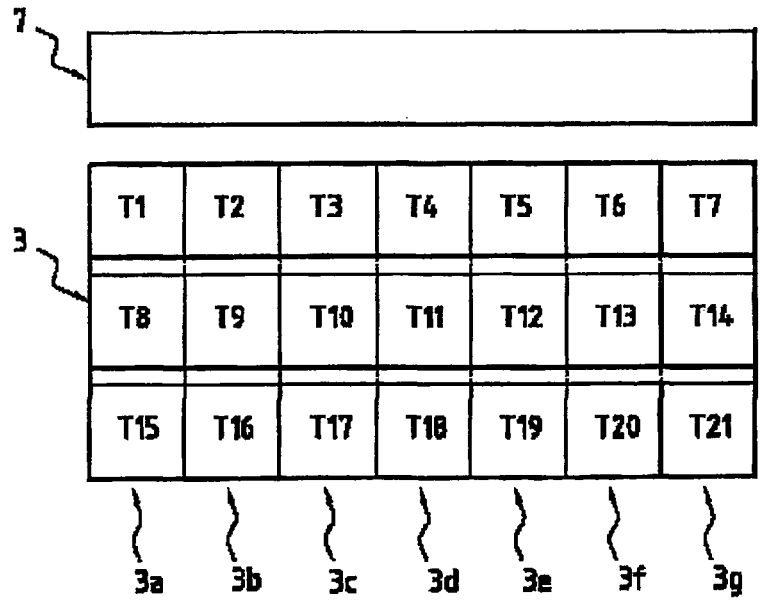
FIG. 5 shows a determination area in relation to the FIG. 3 example.
Figure 4:
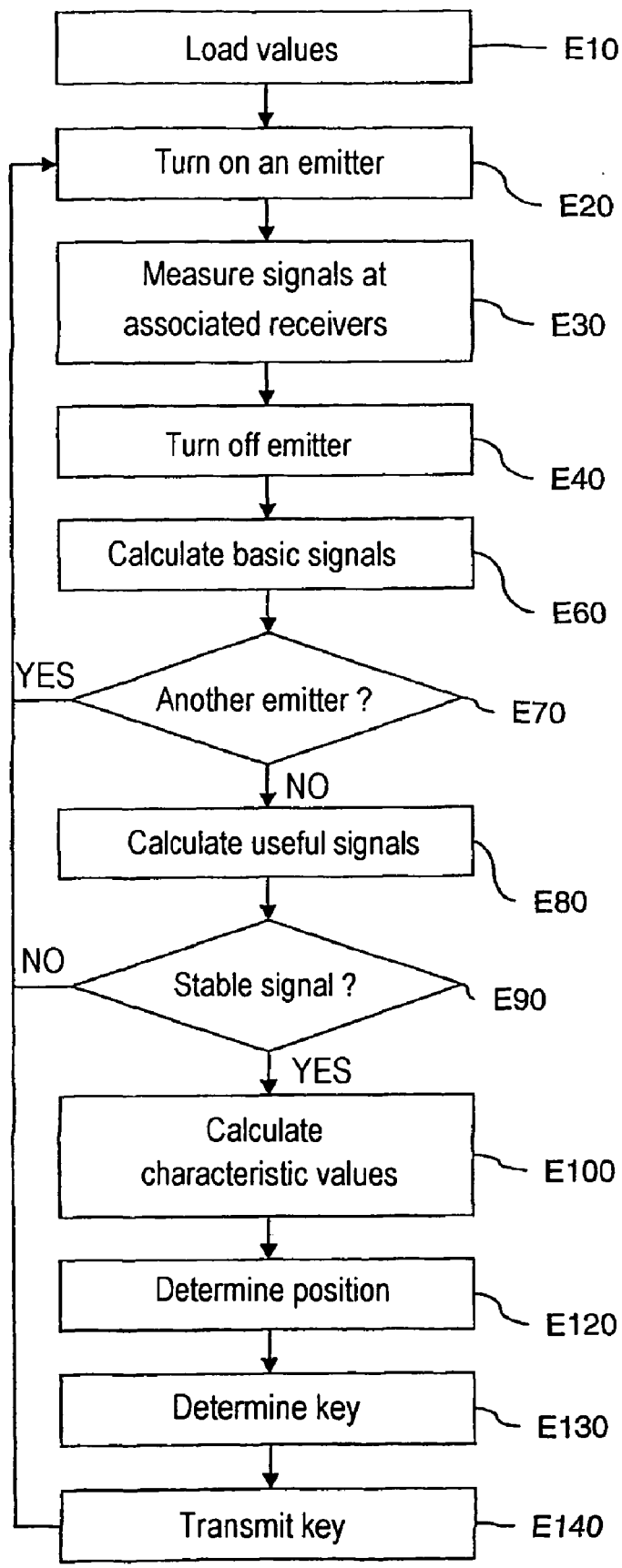
FIG. 4 is a flowchart showing the principle of optical detection of an object in a particular area of a surface by the FIG. 3 device.

FIGS. 3 to 5 show an embodiment of a device and a method of optical detection in accordance with the invention.

In the FIG. 3 example, the alternating set of light emitters and receivers comprises seven emitters (for example infrared emitters) and six receivers connected to a control module 33 comprising a microprocessor-based control unit 23, a multiplexer 43, a random access memory 44, an analog-to-digital converter 45, and storage means 47 in the form of an EEPROM.

The storage means 47 store the position tables Tx and Ty.

The unit 23 controls the turning on and off of each of the emitters and the measurement by each of the receivers.

The particular detection area 3 is defined by seven detection areas or columns 3a to 3g. The emitters and receivers are associated as in the previous example described with reference to FIG. 2B.

Thus the signals are delivered by the receivers via the connection 41 to the input of the multiplexer 43 whose output is connected to the analog-to-digital converter 45. The data V(Ei, Ri) resulting from the conversion of the signals from the receivers 11 is stored in the random access memory 44 under the control of the control unit 23 that is connected to the units 43, 44, 45 and 47 by connections 53, 54, 55 and 57, respectively.

FIG. 4 is a flowchart showing the instructions integrated into the unit 23 controlling the turning on and off of each of the emitters and the measurement at each of the receivers.

In a step E10, previously stored "idle" reflection values, i.e. when the reflection values there is no object in the particular area 3, are loaded into the control unit 23.

In a step E20, an emitter Ei is turned on.

In a step E30, the signal(s) from the receiver(s) Rj associated with this emitter Ei is/are measured and stored in the random access memory 44.

In a step E40, the emitter is turned off.

In a step E60, "base signals" are calculated by subtracting the values measured in the preceding step E40 from those measured in the step E30.

A step E70 is a test for repeating the steps E20 to E60 for each emitter-receiver pair necessary for calculating the characteristic values K1, K2.

In a step E80, the stored idle reflection values loaded during the initialization of the program are subtracted from these basic signal values to form "useful signal" values V(Ei, Rj) stored in the random access memory 44.

In a step E90, if the signal is not stable, i.e. if the useful signals have evolved since the last iteration, the process starts again at the step E20.

Conversely, if the signal is stable, i.e. if the useful signals have not changed for a given number of iterations, and if the reflected signal is greater than a threshold value, then the next step is a step E 100.

In the step E100, the characteristic values K1, K2 are calculated from the measured values V(Ei, Rj) as described above.

In a step E120, the position (x, y) of the object 5 is determined by reading the position cables Tx, Ty indexed by the characteristic values K1, K2.

These tables may be calculated beforehand on a microcomputer.

The processor unit in the control unit then merely calculates characteristic values K1, K2 continuously and uses the position tables established by the microcomputer to determine the coordinates of the object.

Then, in a step E130, thresholds are applied to sample the coordinates calculated in the preceding step in order to transform them into a key number.

By way of example, FIG. 5 shows a particular area 3 of the FIG. 3 example including seven columns and three rows featuring 21 keys T1 to T21. For example, this particular area 3 may correspond to a field of approximately 11×6 cm.

Finally in a step E140, the key number is sent to a microcomputer, industrial or other type of equipment to which the device of the invention is connected before the process is started again from step E20.

Figure 6:
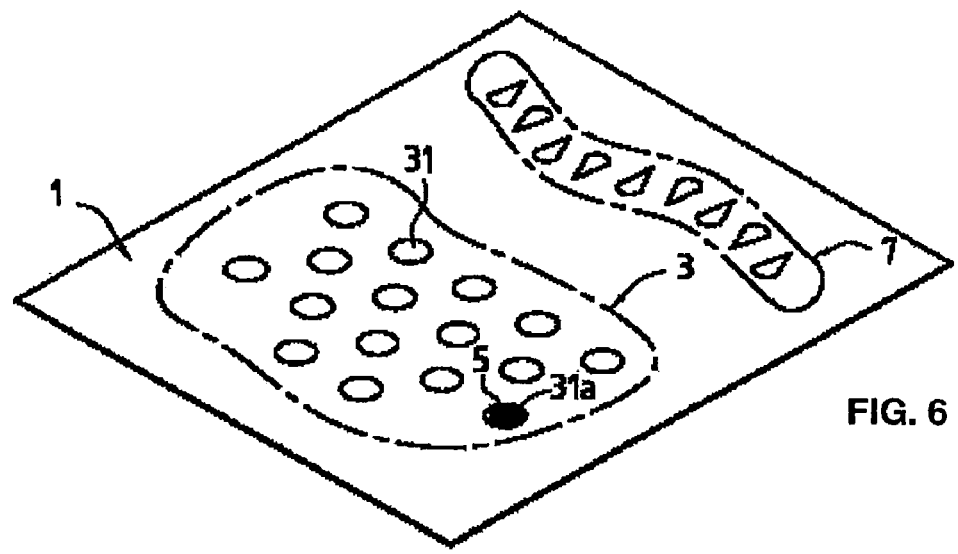
FIG. 6 shows a particular area including elementary areas as in FIG. 1.

FIG. 6 shows that the particular area 3 can include a set of elementary areas 31 each associated with a given function so that any position of the object 5 in an elementary area 31*a* activates the function associated with that elementary area 31*a*.

Accordingly, the device of the invention may correspond to a data input terminal for manual data input to computers, fixed or mobile telephones, personal digital assistants, or any other electronic device.

The particular area 3 can correspond to an input area and each of the elementary areas can correspond to a key.

Figure 7:
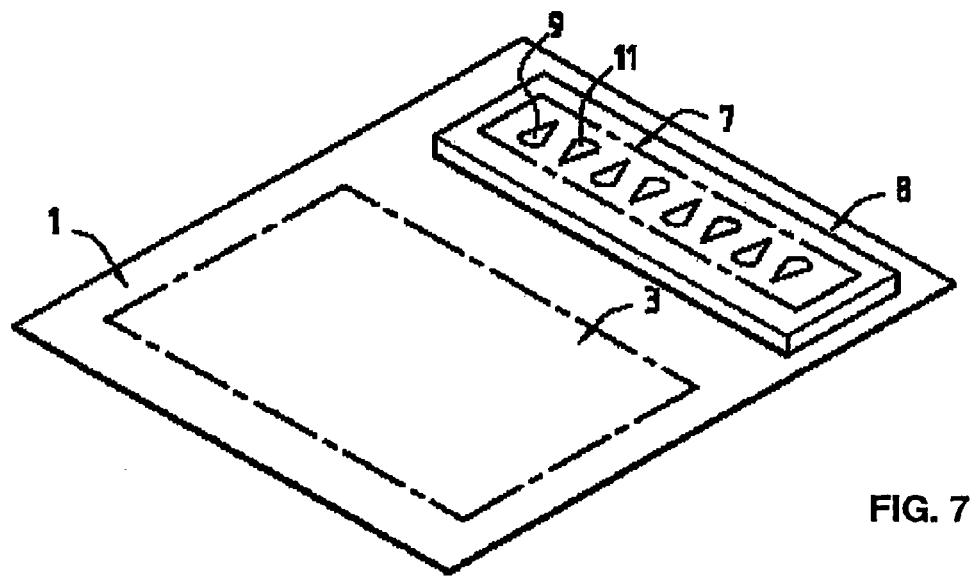
FIG. 7 is a variant of FIG. 1.

FIG. 7 shows a particular area 3 of rectangular shape and a set 7 of emitters E and receivers R of light disposed in the vicinity of one side only of this rectangular area, for example its longer side, in one particular embodiment of the invention.

The set of emitters E and receivers R may be included in a strip 8 that easily integrates into various surfaces, for example an LCD screen.

Note that the device of the invention may be fixed to any surface (computer screen, etc.) that serves only as a frame of reference for a user and onto which the input keys are screen-printed or etched.

The person skilled in the art will of course understand that the device may be used to detect the displacement of an object and to measure the speed of that displacement by analyzing successive positions of the object.

What is claimed is:

1. An optical detection method of determining the position of an object in a particular detection area of a surface, the method comprising:
    a preliminary step of disposing in the vicinity of said detection area and on the same side thereof relative to the object at least four elements including two emitters of light and at least two receivers of light adapted to cover the detection area, each emitter being adapted to emit light in such a way that it does not hit said surface in the detection area, said emitters and receivers being disposed in an alternating and regular arrangement, the method further comprises:
    a step during which one of said receiver measures the quantity of light reflected by the object when the object is illuminated by one of said emitters for at least two different emitter—receiver pairs,
    a step of calculating at least two characteristic values from said measured values, wherein, as emitters and receivers are disposed in the alternating and regular arrangement, a characteristic value is calculated for each emitter by averaging the values measured by the receivers on each side of said emitter when only said emitter is turned on, and
    a step of determining at least one position of the object by directly reading a table indexed by said at least two characteristic values, the content of said table being predetermined and set before said measurement step.

2. A method according to claim 1, wherein, a characteristic value is calculated for each emitter by calculating a function of the values measured by at least three receivers when only that emitter is turned on, the coefficients of this affine function being a function of the distance between each receiver and that emitter.

3. A method according to claim 1, wherein said measurement step is repeated for each of said emitter—receiver pairs until a stable quantity of reflected light is measured.

4. A method according to claim 1, wherein said predetermined table is obtained by a polynomial regression method from a number of preliminary measurements effected under the same conditions as apply to said measurement step.

5. A method according to claim 1, wherein said surface is substantially plane, and wherein, during said preliminary step, there are disposed in a single line emitters and receivers of light having an emission axis, respectively a reception axis, substantially parallel to said particular detection area.

6. A method according to claim 1, wherein said detection area is rectangular and the emitters and receivers are disposed in the vicinity of only one side of said rectangular area.

7. A method according to claim 1, wherein the light emitted by the light emitters is ordinary non-coherent light.

8. A method according to claim 7, wherein the wavelength of the light emitted is in one of the following ranges of wavelengths: UV, visible, infrared.

9. A method according to claim 1, wherein said detection area comprises a set of elementary areas each associated with a given function so that any position of the object in an elementary area activates the function associated with that elementary area.

10. The use of a detection method according to claim 1 to detect the displacement of an object or to measure the speed of displacement of an object.

11. An optical detection method of determining the position of an object in a particular detection area of a surface, the method comprising:
    a preliminary step of disposing in the vicinity of said detection area and on the same side thereof relative to the object at least four elements including two emitters of light and at least two receivers of light adapted to cover the detection area, each emitter being adapted to emit light in such a way that it does not hit said surface in the detection area, said emitters and receivers being disposed in an alternating and regular arrangement, the method further comprising:
    a step during which one of said receiver measures the quantity of light reflected by the object when the object is illuminated by one of said emitters for at least two different emitter—receiver pairs,
    a step of calculating at least two characteristic values from said measured values, wherein, as emitters and receivers are disposed in the alternating and regular arrangement, a characteristic value is calculated for each receiver by averaging the values measured by that receiver when the emitters situated on each side of said receiver are turned on successively,
    a step of determining at least one position of the object by directly reading a table indexed by said at least two characteristic values, the content of said table being determined and set before said measurement step.

12. A method according to claim 11, wherein said measurement step is repeated for each of said emitter—receiver pairs until a stable quantity of reflected light is measured.

13. A method according to claim 11, wherein said predetermined table is obtained by a polynomial regression method from a number of preliminary measurements effected under the same conditions as apply to said measurement step.

14. A method according to claim 11, wherein said surface is substantially plane, and wherein, during said preliminary step, there are disposed in a single line emitters and receivers of light having an emission axis, respectively a reception axis, substantially parallel to said particular detection area.

15. A method according to claim 11, wherein said detection area is rectangular and the emitters and receivers are disposed in the vicinity of only one side of said rectangular area.

16. A method according to claim 11, wherein the light emitted by the light emitters is ordinary non-coherent light.

17. A method according to claim 11, wherein said detection area comprises a set of elementary areas each associated with a given function so that any position of the object in an elementary area activates the function associated with that elementary area.

18. The use of a detection method according to claim 11 to detect the displacement of an object or to measure the speed of displacement of an object.

19. An optical detection device for determining the position of an object on a particular detection area of a surface, said device comprising, disposed in the vicinity of said particular area, and on the same side thereof with respect to the object, at least four elements including:
   at least two emitters of light adapted to emit light so that it does not hit said surface in the detection area, and
   at least two receivers one receiver of light adapted to cover said detection area and to measure a value representative of the quantity of light reflected by the object,
   said emitters and receivers being disposed in an alternating and regular arrangement,
   said device further comprising control means for turning on said emitter and processor means adapted:
   to obtain and store for at least two different emitter—receiver pairs the quantity of light reflected by said object and measured by said receiver when the object is illuminated by said emitter,
   to calculate at least two characteristic values from said measured values, wherein as emitters and receivers are disposed in the alternating and regular arrangement, a characteristic value is calculated for each emitter by averaging the values measured by the receivers on each side of said emitter when only said emitter is turned on, and
   to determine at least one position of the object by directly reading a table indexed by said at least two characteristic values, the content of said table being predetermined and set before said step of obtaining the quantity of light reflected by said object.

20. A device according to claim 19, wherein, the processor means calculate a characteristic value for each emitter by calculating a function of the values measured by at least three receivers when only that emitter is turned on, the coefficients of this affine function being a function of the distance between each receiver and that emitter.

21. A device according to claim 19, wherein the processor means are adapted to repeat said measurement step for each of said emitter and receiver pairs until a stable quantity of reflected light is measured.

22. A device according to claim 19, wherein said predetermined table is obtained by a polynomial regression method from a number of preliminary measurements effected under the same conditions as apply to said measurement.

23. A device according to claim 19, wherein said surface is substantially plane, and wherein said emitters and receivers are disposed in a single line and have respective light emission and reception axes substantially parallel to said particular detection area.

24. A device according to claim 19, wherein said detection area is rectangular and the emitters and receivers are disposed in the vicinity of only one side of said rectangular area.

25. A device according to claim 19, wherein the light emitted by the light emitters is ordinary non-coherent light.

26. A device according to claim 25, wherein the wavelength of the light emitted is in one of the following ranges of wavelengths: UV, visible, infrared.

27. A device according to claim 19, wherein said particular area comprises a set of elementary areas each associated with a given function so that any position of the object in an elementary area activates the function associated with that elementary area.

28. A device according to claim 27, wherein said particular area corresponds to an input area and each of the elementary areas corresponds to a key.

29. A data input terminal including a device according to claim 19.

30. The use of a detection device according to claim 19 to detect the displacement of an object or to measure the speed of displacement of an object.

31. An optical detection device for determining the position of an object on a particular detection area of a surface, said device comprising, disposed in the vicinity of said particular area, and on the same side thereof with respect to the object, at least four elements including:
   at least two emitter of light adapted to emit light so that it does not hit said surface in the detection area, and
   at least two receivers of light adapted to cover said detection area and to measure a value representative of the guantity of light reflected by the obiect,
   said emitters and receivers being disposed in an alternating and regular arrangement,
   said device further comprising control means for turning on said emitter and processor means adapted:
   to obtain and store for at least two different emitter—receiver pairs the quantity of light reflected by said obiect and measured by said receiver when the object is illuminated by said emitter,
   to calculate at least two characteristic values from said measured values, wherein as emitters and receivers are disposed in an alternating and regular arrangement, a characteristic value is calculated for each receiver by averaging the values measured by that receiver when the emitters situated on each side of said receiver are turned on successively, and
   to determine at least one position of the obiect by directly reading a table indexed by said at least two characteristic values, the content of said table being predetermined and set before said step of obtaining the guantity of light reflected by said obiect.

32. A device according to claim 31, wherein the processor means are adapted to repeat said measurement step for each of said emitter and receiver pairs until a stable quantity of reflected light is measured.

33. A device according to claim 31, wherein said predetermined table is obtained by a polynomial regression method from a number of preliminary measurements effected under the same conditions as apply to said measurement.

34. A device according to claim 31, wherein said surface is substantially plane, and wherein said emitters and receivers are disposed in a single line and have respective light emission and reception axes substantially parallel to said particular detection area.

35. A device according to claim 31, wherein said detection area is rectangular and the emitters and receivers are disposed in the vicinity of only one side of said rectangular area.

36. A device according to claim 31, wherein the light emitted by the light emitters is ordinary non-coherent light.

37. A device according to claim 31, wherein said particular area comprises a set of elementary areas each associated with a given function so that any position of the object in an elementary area activates the function associated with that elementary area.

38. A data input terminal including a device according to claim 31.

39. The use of a detection device according to claim 31 to detect the displacement of an object or to measure the speed of displacement of an object.

* * * * *